United States Patent
Schlienger et al.

(10) Patent No.: US 7,551,977 B2
(45) Date of Patent: Jun. 23, 2009

(54) METHOD AND APPARATUS ASSOCIATED WITH ANISOTROPIC SHRINK IN SINTERED CERAMIC ITEMS

(75) Inventors: M. Eric Schlienger, American Canyon, CA (US); Nina Bergan French, Napa, CA (US); Michael D. Baldwin, American Canyon, CA (US); Michael Maguire, Napa, CA (US); Paul Withey, Derby (GB)

(73) Assignee: Rolls-Royce Corporation, Indianapolis, IN (US)

( * ) Notice: Subject to any disclaimer, the term of this patent is extended or adjusted under 35 U.S.C. 154(b) by 226 days.

(21) Appl. No.: 11/788,286

(22) Filed: Apr. 19, 2007

(65) Prior Publication Data

US 2008/0063867 A1 Mar. 13, 2008

Related U.S. Application Data

(63) Continuation of application No. PCT/US2005/037681, filed on Oct. 18, 2005.

(60) Provisional application No. 60/620,104, filed on Oct. 19, 2004.

(51) Int. Cl.
- *G06F 19/00* (2006.01)
- *B29C 35/04* (2006.01)
- *G03C 5/00* (2006.01)

(52) U.S. Cl. .......... 700/120; 264/2.2; 264/672

(58) Field of Classification Search ........ 700/118–121; 264/2.2, 401, 672; 430/269
See application file for complete search history.

(56) References Cited

U.S. PATENT DOCUMENTS

| | | | |
|---|---|---|---|
| 5,017,753 A | 5/1991 | Deckard | |
| 5,258,146 A | 11/1993 | Almquist et al. | |
| 5,430,666 A | 7/1995 | DeAngelis et al. | |
| 5,552,995 A * | 9/1996 | Sebastian | 700/97 |
| 5,616,294 A | 4/1997 | Deckard | |
| 5,639,070 A | 6/1997 | Deckard | |
| 5,733,497 A | 3/1998 | McAlea et al. | |
| 5,822,206 A * | 10/1998 | Sebastian et al. | 700/97 |
| 5,849,238 A | 12/1998 | Schmidt et al. | |
| 5,891,382 A | 4/1999 | Almquist et al. | |
| 5,951,304 A * | 9/1999 | Wildes et al. | 439/67 |
| 5,989,476 A | 11/1999 | Lockard et al. | |
| 6,027,326 A | 2/2000 | Cesarano, III et al. | |
| 6,048,487 A | 4/2000 | Almquist et al. | |
| 6,245,281 B1 | 6/2001 | Scholten et al. | |
| 6,399,010 B1 | 6/2002 | Guertin et al. | |
| 6,517,773 B1 | 2/2003 | Mitchell et al. | |
| 6,531,191 B1 | 3/2003 | Notenboom | |
| 6,656,409 B1 | 12/2003 | Keicher et al. | |
| 6,782,940 B2 | 8/2004 | Billiet et al. | |
| 7,381,283 B2 * | 6/2008 | Lee et al. | 156/89.12 |
| 2001/0003004 A1 | 6/2001 | Leyden et al. | |
| 2002/0105114 A1 | 8/2002 | Kubo et al. | |
| 2002/0158054 A1 | 10/2002 | Manetsberger et al. | |
| 2002/0177727 A1 | 11/2002 | Wellinghoff et al. | |
| 2003/0006534 A1 | 1/2003 | Taboas et al. | |
| 2003/0062655 A1 | 4/2003 | Lohner et al. | |
| 2004/0018107 A1 | 1/2004 | Khoshnevis | |
| 2004/0021256 A1 | 2/2004 | DeGrange et al. | |
| 2004/0196638 A1 | 10/2004 | Lee et al. | |

\* cited by examiner

*Primary Examiner*—M. N. Von Buhr
(74) *Attorney, Agent, or Firm*—Krieg DeVault LLP; Matthew D. Fair, Esq.

(57) ABSTRACT

A manufacturing method for producing ceramic item from a photocurable ceramic filled material by stereolithography. The method compensates for the anisotropic shrinkage of the item during firing to produce a dimensionally accurate item.

56 Claims, 5 Drawing Sheets

METHOD AND APPARATUS ASSOCIATED WITH ANISOTROPIC SHRINK IN SINTERED CERAMIC ITEMS

The present application is a continuation of PCT Patent Application No. PCT/US2005/037681 filed Oct. 18, 2005, which claims the benefit of U.S. Provisional Patent Application Ser. No. 60/620,104 filed Oct. 19, 2004, each of which is incorporated herein by reference.

BACKGROUND OF THE INVENTION

The present invention relates generally to a method for producing ceramic items utilizing ceramic stereolithography. More specifically, in one form the invention relates to a method for compensating for the anisotropic shrinkage of a ceramic item to produce dimensionally accurate ceramic stereolithography items.

Engineers and scientists are working in the field of stereolithography to develop additional processes for the production of components. In the area of non-ceramic stereolithography the scientific community is mainly concerned with shrinkage associated with the curing of the polymeric material. The types of materials used in non-ceramic stereolithography generally have very small shrink rates associated with post cure processing; such as by ultraviolet lamps.

In the area of ceramic stereolithography, there presently does not appear to be significant developmental activity going on associated with the study of dimensional accuracy of sintered ceramic stereolithography items. An interest in producing dimensionally accurate parts through ceramic stereolithography provided motivation for the development of the present inventions. The present invention satisfies this need and others in a novel and unobvious way.

SUMMARY OF THE INVENTION

The present inventions are set forth literally in the claims. The invention generally can be summarized as a method for compensating for the anisotropic shrinkage of a ceramic item when it is sintered.

One object of the present invention is to provide a unique method for producing a ceramic item.

Related objects and advantages of the present invention will be apparent from the following description.

DESCRIPTION OF THE PREFERRED EMBODIMENTS

For purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The general field of ceramic stereolithography is believed known to those of ordinary skill in the art. More specifically, ceramic stereolithography utilizes a photo-polymerizable resin containing ceramic particles that solidifies when exposed to an appropriate energy dose. The present invention contemplates that the photo-polymerizable material including ceramic particles can be described in many ways including, but not limited to filled and loaded. In one form of the present invention the photo-polymerizable material includes ceramic particles within a range of 35% to 65% by volume; however other relationships are contemplated herein.

The photo-polymerizable ceramic resin after being dosed with energy forms a green state ceramic item. The green state ceramic item is subjected to a burning off act to remove the photo-polymer and then a sintering act is applied to the ceramic material. During the sintering of the ceramic material there is a volumetric change in the item. Further, the inventors have recognized that there is generally very little volumetric change occurring during the burning off act of the photo-polymer. In one form ceramic stereolithography is accomplished in a machine adapted for stereolithography operations and available from 3D Systems of Valencia, Calif. However, the present inventions are applicable with virtually any type of apparatus or techniques for producing an item by stereolithography. Further, information related to selective laser activation and/or stereolithography is disclosed in U.S. Pat. Nos. 5,256,340, 5,556,590, 5,571,471 and in pending U.S. patent application Ser. No. 10/462,168, which are all incorporated herein by reference.

Figure 1:
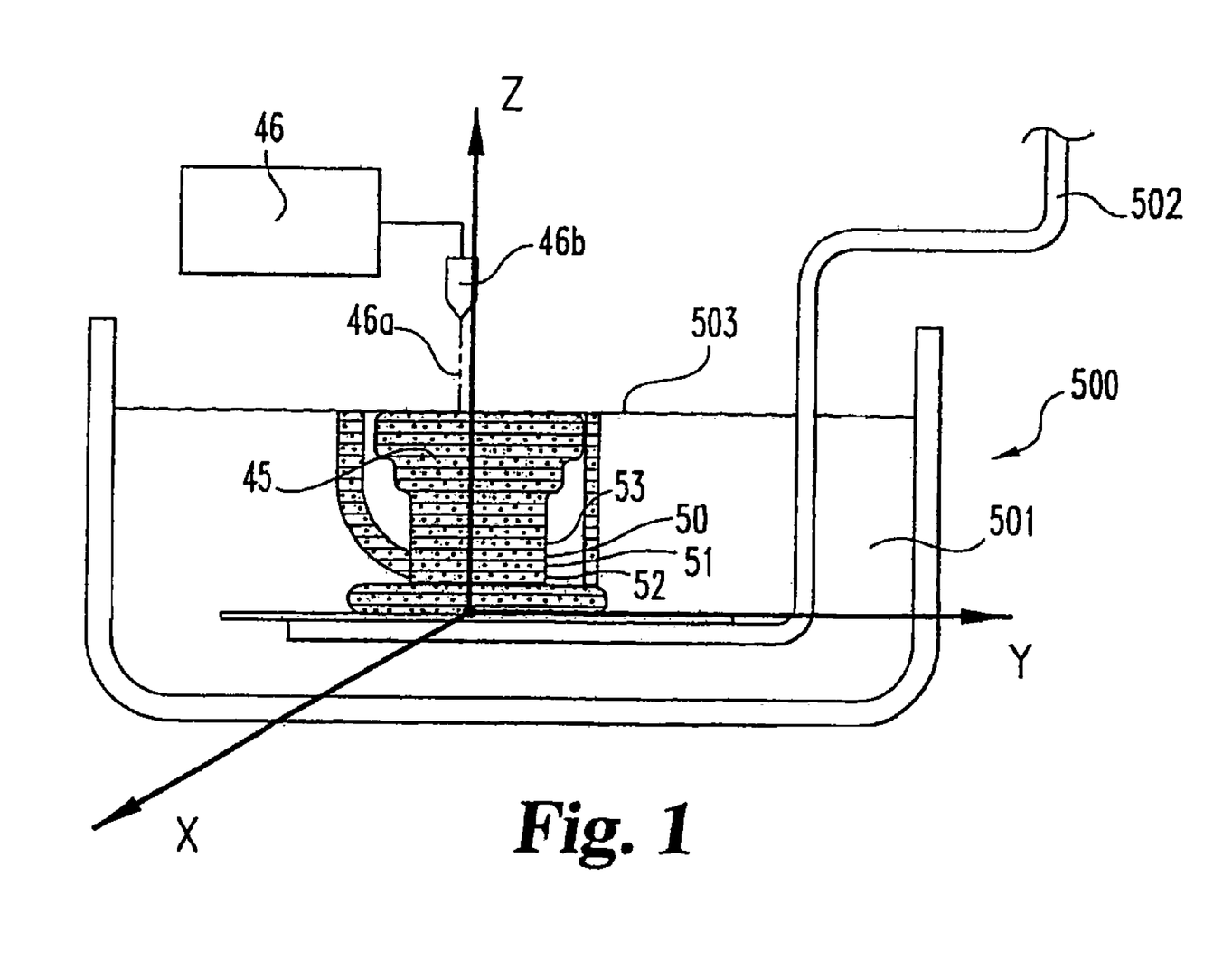
FIG. 1 is an illustrative view of one form of an item being fabricated by a stereolithography process.

With reference to FIG. 1, there is illustrated one embodiment of an item 45 being formed by a ceramic stereolithography process. Ceramic stereolithography as utilized herein should be broadly construed and includes the utilization of ceramic material within a photo-polymerizabele resin. The term item is intended to be read broadly and includes, but is not limited to, molds, parts, components and/or subcomponents. Item 45 is merely illustrative and is shown being formed by the photo-polymerization of the ceramic filled resin into layers (e.g. 50, 51, 52, 53) of ceramic particles that are held together by a polymer binder. The reader should understand that there is no intention herein to limit the present application to any particular number of layers unless specifically provided to the contrary.

Stereolithography apparatus 500 is illustrated in a simplified manner to facilitate the explanation of one method of making ceramic item 45. In one form the formation of the layers (e.g. 50-53) utilizes a leveling technique to level each of the layers of photo-polymerizable ceramic filled resin prior to receiving a dose of energy. The present application contemplates the following techniques to level the resin: ultrasonic processing; time delay; and/or mechanically assisted sweep such a wiper blade. However, the present application also contemplates an embodiment that does not utilize express techniques for leveling each of the layers prior to receiving a dose of energy. A three dimensional coordinate system including a first axis, a second axis and a third axis is utilized as a reference for the item being fabricated. In one form the three dimensional coordinate system is a Cartesian coordinate system. More preferably, the Cartesian coordinate system includes an X, Y and Z axis utilized as a reference for the item being fabricated correspond to the axis of the stereolithography apparatus. However, other three dimensional coordinate systems are contemplated herein, including but not limited to polar, cylindrical, spherical. The text will generally describe the present invention in terms of a Cartesian coordinate system, however it is understood that it is equally applicable to other three dimensional coordinate systems.

In one form stereolithography apparatus 500 includes a fluid/resin containment reservoir 501, an elevation-changing member 502, and a laser 46. The reservoir 501 is filled with a quantity of the photocurable ceramic filled resin from which the item 45 is fabricated. Item 45 is illustrated being fabricated in layer by layer fashion in the stereolithography apparatus 500 in the direction of axis Z; which is referred to as the build direction. The item 45 is built at a build orientation angle as measured from the axis Z. The build orientation angle illustrated is zero °; however there is no limitation intended herein regarding the build orientation angle as other build orientation angles are fully contemplated herein. The three dimensional coordinate system is aligned with the build orientation angle. More specifically, in a preferred form the three dimensional coordinate system of the item being fabricated and the stereolithography apparatus' coordinate system are coextensive.

Figure 2:
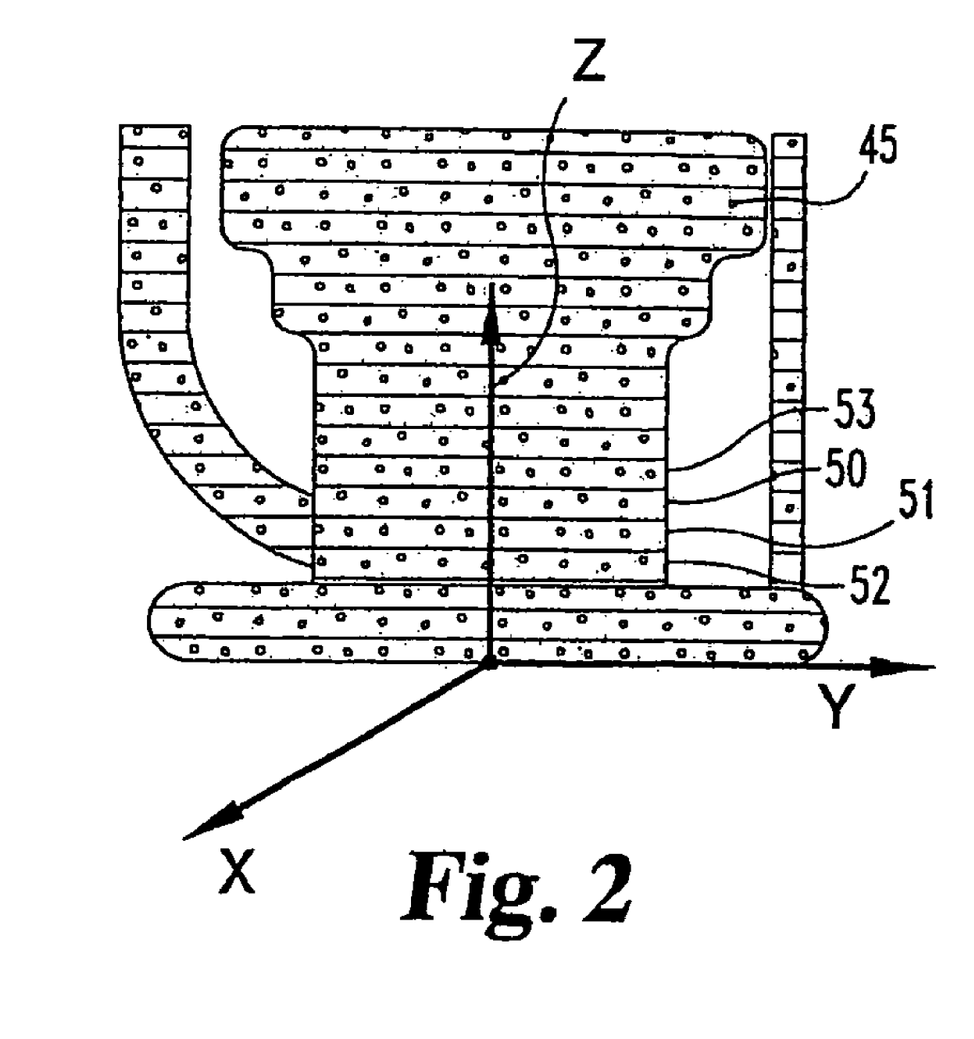
FIG. 2 is an illustrative view of the layer built item of FIG. 1.

With reference to FIG. 2, there is illustrated an enlarged view of a portion of the item 45. The item 45 includes a plurality of cured layers 50, 51, 52 which define a portion of the item. The present application contemplates that the term cured includes partially or totally cured layers. The layers are contemplated as having the same or different shapes, may be solid or contain voids or holes, may have the same or differing thickness as required by the design parameters. In one form the cured layers have a thickness within a range of about 0.001 to about 0.008 inches. In another form each of the layers has a thickness of about 0.002 inches. However, other cured layer thickness are contemplated herein.

Figure 3:
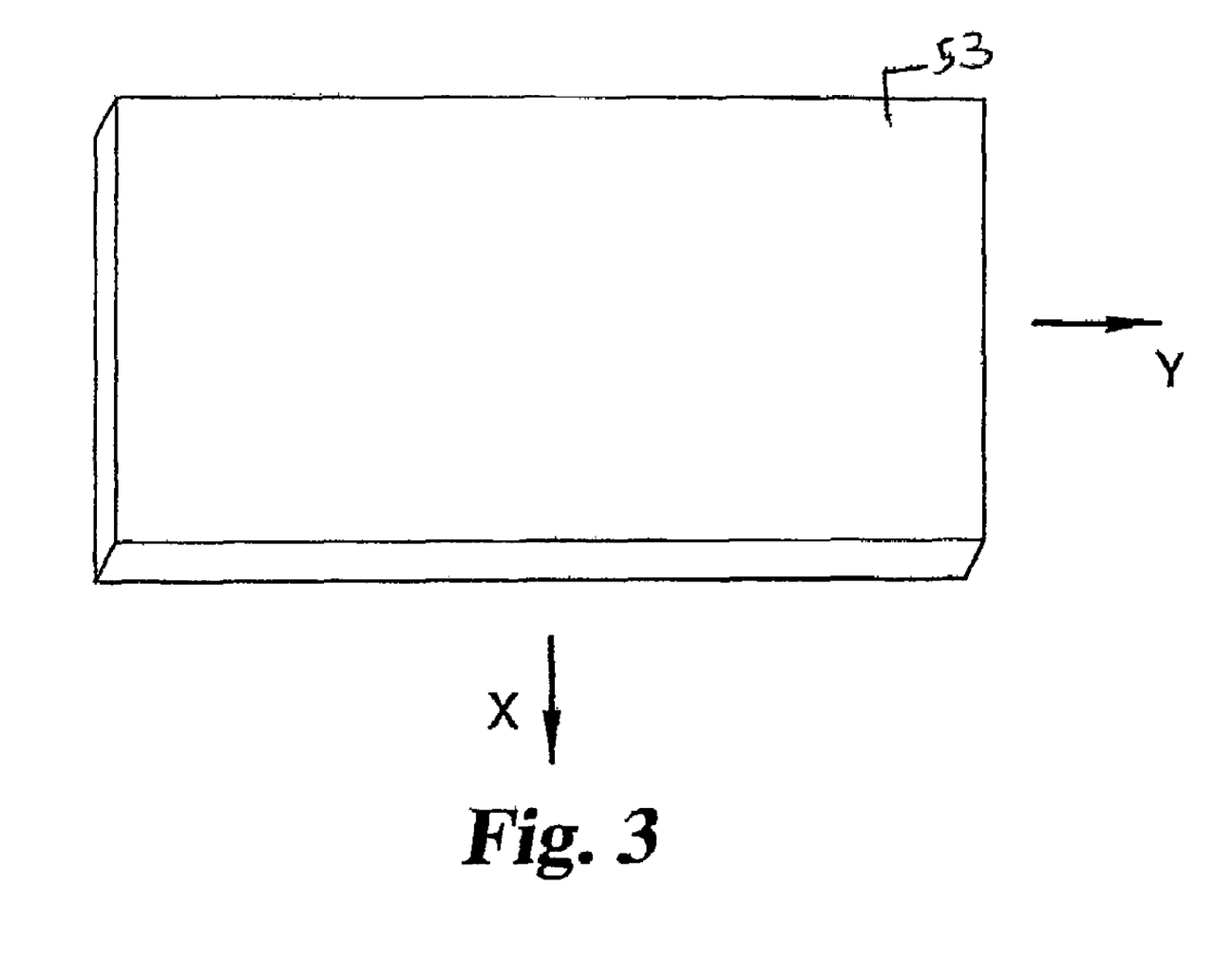
FIG. 3 is an illustrative top plan view of a portion of one of the layers of the item of FIG. 2.

With reference to FIG. 3, there is set forth a purely illustrative plan view of a portion of a layer 53. Layer 53 represents a portion of a layer formed in a stereolithography apparatus 500 that utilized a wiper blade moved in the direction of axis Y to level the photo-polymerizable ceramic filled resin prior to receiving a dose of energy. The wiper blade interacts with the photo-polymerizable ceramic filled material and affects the homogeneity in at least two dimensions. The inventors have discovered that the shrinkage in the item associated with a subsequent sintering act is anisotropic in the three directions; for example the X, Y and Z directions. Anisotropic shrinkage can be considered to occur when isotropic shrinkage is not sufficient to keep the sintered item within a predetermined geometric tolerance. In the discussion of the anisotropic shrinkage relative to the X, Y and Z axis the Z axis represents the build direction and the Y axis represents the direction of the movement of the wiper blade. The inventors have determined that shrinkage in the Z direction (build direction) is greater than in the X and Y directions. Factors to consider when evaluating the shrinkage are the solid loading in the photo-polymerizable resin, the resin formulation, the build style and orientation and how the item is sintered.

Figure 4:
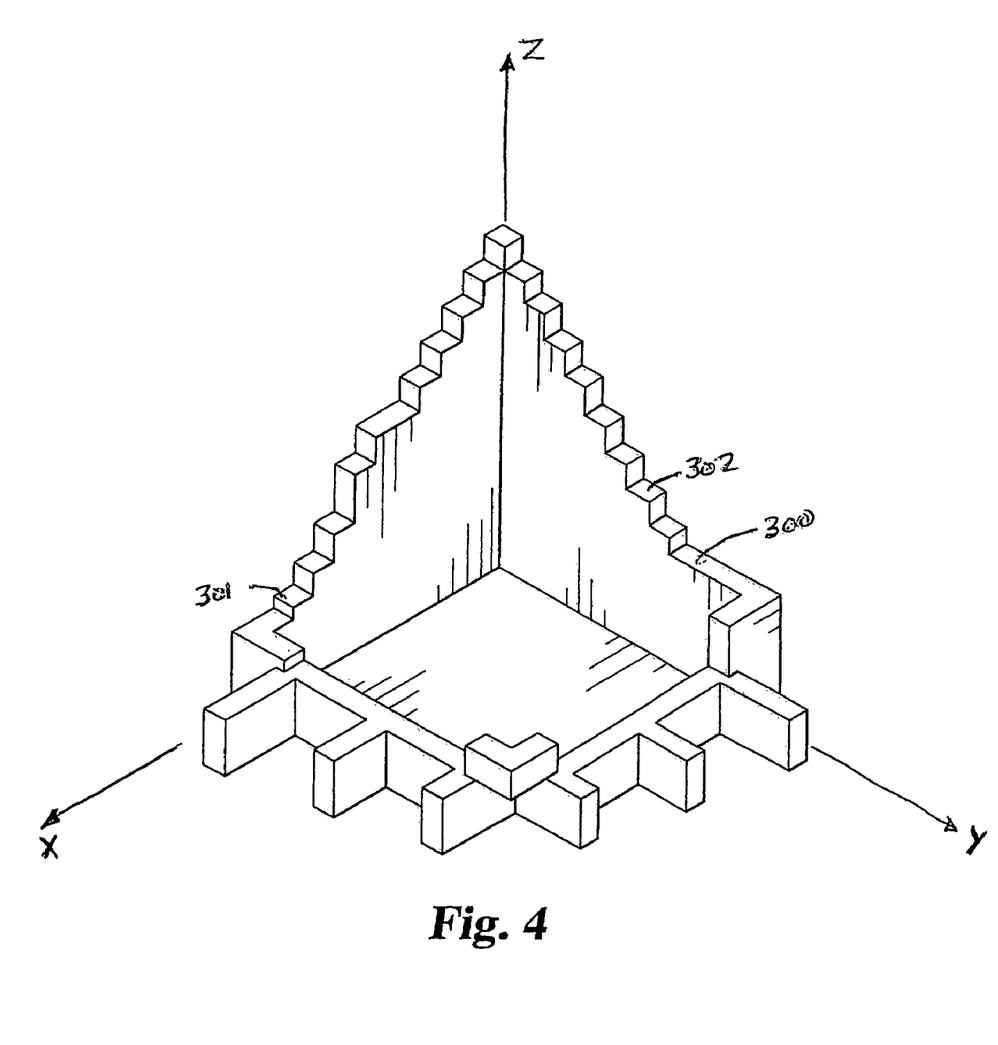
FIG. 4 is a perspective view of one embodiment of a shrinkage measurement test item.

With reference to FIG. 4, there is illustrated one embodiment of a shrinkage measurement test model 300. In one form the shrinkage measurement test model 300 is created as a solid body model and then generated as an STL file. In one form the item is oriented such that the back corner represents the origin of a Cartesian coordinate system X, Y, Z. The vertical direction of the STL being aligned with the Z axis and the two sides 301 and 302 being aligned with the X and Y axis respectively. The item is than built in a stereolithography apparatus with the Cartesian coordinate system of the item aligned with the coordinate system of the stereolithography apparatus. The present invention can be utilized with any suitable file format and/or hardware.

The shrinkage measurement test model 300 in the green state is then subjected to a comprehensive inspection to quantify dimensions of the item. The measurements taken during inspection can be obtained with known equipment such as, but not limited to calipers and/or coordinate measuring machines. In one form the shrinkage measurement test model has been designed so that all of the inspection dimensions line up along the X, Y and/or Z axis. The item is then subjected to a firing act to burn off the photo-polymer and sinter the ceramic material. The comprehensive inspection is repeated to quantify the dimensions of the item after being sintered.

The measured values from the comprehensive inspection after firing are than compared with the inspection values from the green state item. In one form the comparison is done by plotting the measured values of the fired item against the measured values from the green state item. A least squares analysis is performed to obtain a linear equation. The resulting slope of the equations is the shrinkage factors for each of the X, Y and Z direction/dimensions. The shrinkage for each of the X, Y and Z directions/dimensions are applied to one of the STL file or the solid body model to expand the dimensions in the respective directions of the coordinate system. The process will modify one of the STL file or the solid body model in the directions of the coordinate system to account for the anisotropic shrinkage of the item. In one non-limiting example the shrinkage factors to account for shrinkage are 118%, 115% and 120% in the X, Y, Z direction respectively for an item having a length of about two inches. The present application contemplates a wide variety of shrinkage factors and is not limited in any manner to these factors unless specifically provided o the contrary.

The application of the present invention enables the production of sintered ceramic items having substantially conformity with the item's design parameters. In one form the dimensional accuracy of the sintered ceramic item to the design parameters is within a range of 0.0% to 1.5% and in another form the dimensional accuracy is within a range of 0.0% to 0.5%. Further, the present invention is also applicable to form sintered ceramic items in either near net shape or net shape. Additionally, other degrees of dimensional accuracy are contemplated herein.

In an alternate form the comparison utilized to calculate the shrinkage factors of the shrinkage measurement test model is between the inspection values of the fired test model and the dimensional design values from the solid body model. The process as described above is then continued to find the shrinkage factors for the X, Y and Z dimensions/directions.

Figure 5:
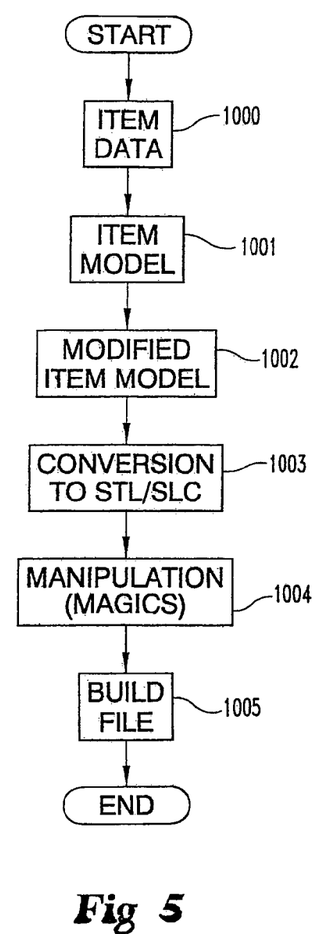
FIG. 5 is a flow chart illustrating one embodiment of a system for creating a build file that determines how the item is built.

With reference to FIG. 5, there is illustrated one non-limiting embodiment of a system for creating a build file 1005 that determines how the item 45 is created in the stereolithography apparatus. This process is representative of a technique that can be utilized to produce the build file, but the present application is not intended to be limited to the one embodiment in FIG. 5 unless specifically stated to the contrary. In act 1000 data defining parameters of the item are collected and processed to define a specification for the item design. The data from act 1000 is utilized in act 1001 to construct an item model using, for example, a computer modeling system. In one embodiment the computer modeling system creates an electronic model such as but not limited to a solid body model. However, other modeling systems are contemplated herein. The item model from act 1001 is then processed in a modified item model act 1002 to create a model of the item taking into account the anisotropic shrinkage. While the present application discusses the process in terms of modification of the item model it is understood that the same type of modification is applicable to the STL/STC files to create a modified item file. The modified item act 1002 utilizes an X shrinkage factor, a Y shrinkage factor and a Z shrinkage factor. The shrinkage factors are used to increase the respective underlaying dimensions to a modified dimension. The X, Y and Z shrinkage factors will be applied so that they correspond to the coordinate system of the stereolithography apparatus.

In one form a conversion act 1003 is utilized to convert the modified item model, produced in act 1002 to a file format, such as STL or SLC. Next, the file from act 1003 is processed in act 1004 to create discrete two-dimensional slices appropriate for drawing the layers of the item and any required supports. In act 1005 the build file is completed, which will be utilized to drive the energy source of the stereolithography apparatus and produce the green ceramic item.

In one form the ceramic filled resin comprises a sinterable ceramic material, a photocurable monomer, a photoinitiator and a dispersant. The ceramic filled resin is adapted for use in stereolithography to produce a green ceramic item. In one form the filled resin is prepared by admixing the components to provide a filled resin having viscosity within a range of about 300 centipoise to about 3,500 centipoise at a shear rate of about 0.4 per second; in another form the filled resin has a viscosity of about 2,500 centipoise at a shear rate of about 0.4 per second. However, the present application contemplates filled resins having other viscosity values.

The loading of ceramic material within the resin is contemplated within a range of 35% to 65% by volume. Another form of the ceramic loading within the resin is contemplated as being about 50.3% by volume. In one preferred resin the ceramic loading has the volume percent of ceramic material substantially equal to the weight percent of ceramic material within the resin. However, resins having other ceramic loadings are fully contemplated herein. More specifically, the present application contemplates that the volume percent of the ceramic material in the resin may be equal to the weight percent of the ceramic material in the resin or that the volume percent of the ceramic material in the resin may be unequal to the weight percent of the ceramic material in the resin. The sinterable ceramic material can be selected from a wide variety of ceramic materials. Specific examples include, but are not limited to, alumina, yttria, magnesia, silicon nitride, silica and mixtures thereof.

In one example alumina is selected as the sinterable ceramic material. Alumina can be provided as a dry powder having an average particle size suitable for sintering to provide an item having the desired characteristics. In one form the powdered alumina has an average particle size within a range of 0.1 microns to 5.0 microns. In another form the powdered alumina is selected to have an average particle size within a range of 0.5 microns to 1.0 microns. However, other particle sizes for the alumina material are contemplated herein.

The monomer is selected from any suitable monomer that can be induced to polymerize when irradiated in the presence of a photoinitiator. Examples of monomers include acrylate esters and substituted acrylate esters. A combination of two or more monomers may be used. Preferably at least one of the monomers is a multifunctional monomer. By multifunctional monomer it is understood that the monomer includes more than two functional moieties capable of forming bonds with a growing polymer chain. Specific examples of monomers that can be used with this invention include 1,6-hexanediol diacrylate (HDDA) and 2-phenoxyethyl acrylate (POEA). In one form the photocurable monomers are present in an amount between about 10 wt % to about 40 wt %, and in another form about 10 wt % to about 35 wt %, and in yet another form about 20 wt % to 35 wt % based upon the total weight of the filled resin. However, the present application contemplates other amounts of monomers.

The dispersant is provided in an amount suitable to maintain a substantially uniform colloidal suspension of the alumina in the filled resin. The dispersant can be selected from a wide variety of known surfactants. Dispersants contemplated herein include, but are not limited to, ammonium salts, more preferably tetraalkyl ammonium salts. Examples of dispersants for use in this invention include, but are not limited to: polyoxypropylene diethyl-2-hydroxyethyl ammonium acetate, and ammonium chloride. In one form the amount of dispersant is between about 1.0 wt % and about 10 wt % based upon the total weight of the ceramic within the filled resin. However, the present application contemplates other amounts of dispersants.

The initiator is selected from a number of commercially available photoinitiators believed known to those skilled in the art. The photoinitiator is selected to be suitable to induce polymerization of the desired monomer when irradiated. Typically the selection of a photoinitiator will be dictated by the wavelength of radiation used to induce polymerization. Photoinitiators contemplated herein include, but are not limited to benzophenone, trimethyl benzophenone, 1-hydroxycyclohexyl phenyl ketone, isopropylthioxanthone, 2-methyl-1-[4(methylthio)phenyl]-2-morpholinoprophanone and mixtures thereof. The photoinitiator is added in an amount sufficient to polymerize the monomers when the filled resin is irradiated with radiation of appropriate wavelength. In one form the amount of photoinitiator is between about 0.05 wt % and about 5 wt % based upon the total weight of the monomer within the filled resin. However, other amounts of photoinitators are contemplated herein.

In an alternate form of the ceramic filled resin a quantity of a nonreactive diluent is substituted for a quantity of the monomer. In one form the amount of substituted nonreactive diluent is equal to between about 5% and about 20% (by weight) of the monomer in the resin. However, the present application contemplates that other amounts of non-reactive diluents are considered herein. An illustration of a given ceramic resin composition requires 100 grams of a monomer that in the alternate form will replace about 5-20 wt % of the monomer with a nonreactive diluent (i.e. 95-80 grams of monomer+5-20 grams of nonreactive diluent). The nonreactive diluent includes but is not limited to a dibasic ester or a decahydronaphthalene. Examples of dibasic esters include dimethyl succinate, dimethyl glutarate, and dimethyl adipate, which are available in a pure form or a mixture.

The filled resin is prepared by combining the monomer, the dispersant and the sinterable ceramic to form a homogeneous mixture. Although the order of addition is not critical to this invention typically, the monomer and the dispersant are combined first and then the sinterable ceramic is added. In one form the sinterable ceramic material is added to the monomer/dispersant combination in increments of about 5 to about 20 vol. %. Between each incremental addition of the ceramic material, the resulting mixture is thoroughly mixed by any suitable method, for example, ball milling for about 5 to about 120 minutes. When all of the sinterable ceramic material has been added, the resulting mixture is mixed for an additional amount of time up to 10 hours or more. The photoinitiator is added and blended into the mixture.

With reference to Table I there is set forth one example of an alumina filled resin. However, the present application is not intended to be limited to the specific composition set forth below unless specifically stated to the contrary.

|  | wt/g | vol cc | wt % | vol % |
|---|---|---|---|---|
| Alumina | 1980 | 500 | 78.2 | 48.0 |
| Monomer | 510 | 500 | 20.1 | 48.0 |
| Dispersant | 39.6 | 38.8 | 1.56 | 3.73 |
| Photoinitiator | 2.55 | 2.32 | 0.101 | 0.223 |
| Total | 2532 | 1041 | 100% | 100% |

In one form the green ceramic item is sintered to a temperature within a range of 1100° C. to 1700° C. The present invention contemplates other sintering parameters. Further, the present invention contemplates sintering to a variety of theoretical densities, including but not limited to about 60% of theoretical density. The density of the sintered material is preferably greater than sixty percent of the theoretical density, and densities equal to or greater than about ninety-four percent of the theoretical density are more preferred. However, the present invention contemplates other densities.

The present application contemplates the utilization of a three dimensional coordinate system as a reference for an item being fabricated from the photo-polymerizable ceramic filled resin. As discussed above the inventors have discovered that the shrinkage of the item in a subsequent sintering act is anisotropic in the three directions. Therefore, in one form of the present invention there are utilized three unequal scaling factors to take into consideration the respective shrinkage in the dimensions of the item in all three directions. In another form of the present invention there are utilized only two unequal scaling factors to account for the respective shrinkage in the dimensions of the item in all three directions; that is the dimensions in two of the three directions are adjusted by scaling factors having the same value.

While the inventions have been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow. In reading the claims it is intended that when words such as "a," "an," "at least one," "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary.

What is claimed:

1. A method, comprising:
    representing an item including its dimensions relative to a three dimensional coordinate system, the item adapted to be formed as a green ceramic item in a stereolithography apparatus from a photo-polymerizable material including ceramic particles;
    applying at least two unequal scaling factors to the dimensions to compensate for the anisotropic shrinkage of the green ceramic item relative to the axes of the coordinate system upon the green ceramic item being sintered;
    building the green ceramic item in the stereolithography apparatus after said applying; and
    heating the green ceramic item to form a sintered ceramic item substantially conforming to the dimensions.

2. The method of claim 1, wherein in said applying the scaling factors are all unequal.

3. The method of claim 1, wherein said building includes forming a plurality of layers of the photo-polymerizable material; and
    which further includes leveling at least one of the plurality of layers of the photo-polymerizable material prior to forming the next of the plurality of layers of the photo-polymerizable material; and
    which further includes exposing the at least one of the plurality of layers of the photo-polymerizable material with a dose of energy prior to forming the next of the plurality of layers of the photo-polymerizable material.

4. The method of claim 3, wherein said leveling including mechanically wiping a surface of the at least one of the plurality of layers of the photo-polymerizable material.

5. The method of claim 4, wherein said mechanically wiping changes the homogeneity of the ceramic particles in at least two dimensions.

6. The method of claim 4, wherein said leveling includes leveling each of the plurality of layers of the photo-polymerizable material; and
    which further includes exposing each of the plurality of layers of the photo-polymerizable material with a dose of energy.

7. The method of claim 1, wherein the stereolithography apparatus includes a machine three dimensional coordinate system coextensive with the three dimensional coordinate system.

8. The method of claim 1, wherein the sintered ceramic item is of a near net shape.

9. The method of claim 1, wherein the sintered ceramic item is of a net shape.

10. The method of claim 1, wherein the sintered ceramic item is dimensionally accurate with the dimensions within about 1.5%.

11. The method of claim 1, wherein the sintered ceramic item is dimensionally accurate with the dimensions within about 0.5%.

12. The method of claim 1, wherein said heating includes burning off a polymer in the green ceramic item.

13. The method of claim 2, wherein the three dimensional coordinate system is a Cartesian coordinate system including a first axis corresponding to the X axis and a second axis corresponding to the Y axis and a third axis corresponding to the Z axis;
    wherein the stereolithography apparatus includes a machine three dimensional coordinate system coextensive with the three dimensional coordinate system;
    which further includes selecting a build direction corresponding to the Z axis;
    wherein said building includes forming a plurality of layers from the photo-polymerizable material in the build direction; and
    which further includes wiping an upper surface of each of the plurality of layers of the photo-polymerizable material prior to being exposed to an energy dose, said wiping in the direction of one of the other axes.

14. The method of claim 1, wherein the photo-polymerizable material includes ceramic particles within a range of 35% to 65% by volume.

15. The method of claim 1, wherein said representing is associated with any of electronic data, digital data, virtual data, computer files, solid body modeling, computer modeling, computer aided manufacturing.

16. The method of claim 1, wherein said heating is to a temperature within a range of about 1100° C. to 1700° C.

17. A method, comprising:
providing a data representation of an item;
selecting a build orientation for building the item in a stereolithography apparatus from a photo-polymerizable material including ceramic particles, wherein the stereolithography apparatus including a three dimensional coordinate system with a first axis, a second axis and a third axis;
modifying the data representation of the item to form a modified data representation by applying a first expansion factor to increase the dimensions of the item along the first axis and a second expansion factor to increase the dimensions of the item along the second axis and a third expansion factor to increase the dimensions of the item along the third axis, wherein said expansion factors are not equal; and
forming a green state ceramic item conforming to the modified data representation by controlling the delivery of energy to the photo-polymerizable material.

18. The method of claim 17, wherein said forming including building a plurality of layers from the photo-polymerizable material, and wherein the photo-polymerizable material includes a monomer and a photoinitator.

19. The method of claim 18, which further includes leveling each of the plurality of layers of the photo-polymerizable material, and wherein said forming includes exposing each of the plurality of layers of the photo-polymerizable material to an energy dose.

20. The method of claim 19, wherein in said forming the item is built in the direction of the third axis and said leveling including mechanically wiping a surface of each of the plurality of layers of the photo-polymerizable material with a wiper blade.

21. The method of claim 17, wherein the modified data representation is one of an electronic data file, digital data file, virtual data file, computer file, computer aided manufacturing file and a computer aided engineering file, and the data representation is a solid body model.

22. The method of claim 17, which further includes burning off a polymer in the green state ceramic item after said forming, and which further includes sintering the green state ceramic item to define a sintered ceramic item.

23. The method of claim 22, wherein the sintered ceramic item is of a near net shape.

24. The method of claim 22, wherein the sintered ceramic item is of a net shape.

25. The method of claim 22, wherein a comparison of the data representation of the item and the sintered ceramic item is dimensionally accurate within about 1.5%.

26. The method of claim 22, wherein a comparison of the data representation of the item and the sintered ceramic item is dimensionally accurate within about 0.5%.

27. The method of claim 17, wherein the coordinate system is a Cartesian coordinate system and the first axis corresponds to the X axis and the second axis corresponds to the Y axis and the third axis corresponds to the Z axis;
which further includes selecting a build direction corresponding to the Z axis;
wherein said forming includes building a plurality of layers from the photo-polymerizable material in the build direction; and
which further includes wiping an upper surface of each of the plurality of layers of the photo-polymerizable material prior to being cured.

28. The method of claim 27, which further includes curing each of the plurality of layers of the photo-polymerizable material, wherein said curing is at least partial.

29. The method of claim 17, wherein the photo-polymerizable material has a ceramic loading within a range of 35% to 65% by volume.

30. A method, comprising:
defining the original dimensions of an item with reference to a three dimensional coordinate system associated with a stereolithography apparatus, the coordinate system including a first direction, a second direction and a third direction;
applying a first factor to increase the original dimensions of the item defined relative to the first direction;
applying a second factor to increase the original dimensions of the item defined relative to the second direction;
applying a third factor to increase the original dimensions of the item defined relative to the third direction, wherein the factors are not equal;
building a green ceramic item by stereolithography from a photo-polymerizable resin including ceramic particles, said building utilizing the increased dimensions from said applying acts to control the dimensions of the green ceramic item; and
sintering the green ceramic item to form a sintered ceramic item, wherein the sintered ceramic item has dimensions corresponding substantially to the original dimensions of the item.

31. The method of claim 30, wherein said defining including capturing the original dimensions in an electronic format.

32. The method of claim 30, which further includes selecting a build orientation before said applying acts.

33. The method of claim 30, wherein in said sintering the sintered ceramic item has a near net shape.

34. The method of claim 30, wherein in said sintering the sintered ceramic item has a net shape.

35. The method of claim 30, wherein the sintered ceramic item is dimensionally accurate with the dimensions within about 1.5%.

36. The method of claim 30, wherein the sintered ceramic item is dimensionally accurate with the dimensions within about 0.5%.

37. The method of claim 30, wherein said building includes forming a plurality of layers from the photo-polymerizable resin, and wherein each of the plurality of layers of the photo-polymerizable resin is mechanically leveled by a moveable wiper blade prior to being cured.

38. The method of claim 37, wherein each of the plurality is at least partially cured.

39. The method of claim 30, wherein the photo-polymerizable resin has a ceramic loading within a range of 35% to 65% by volume.

40. The method of claim 30, which further includes selecting a build direction corresponding to the third direction;
wherein said building includes forming a plurality of layers from the photo-polymerizable resin;
which further includes wiping an outer surface of each of the plurality of layers of the photo-polymerizable resin prior to being cured; and
wherein said three dimensional coordinate system is defined by the three dimensional coordinate of the stereolithography apparatus.

41. A method comprising:
defining an article in terms of first reference data relative to the axes of a three dimensional coordinate system, the first reference data including first X components oriented with a first axis, first Y components oriented with a second axis and first Z components oriented with a third axis;
building in a stereolithography apparatus a green ceramic test item corresponding to the first reference data from a photocurable ceramic filled resin;
measuring the green ceramic test item to obtain second reference data defining the test item relative to the three dimensional coordinate system, the second reference data including second X components oriented with the first axis, second Y components oriented with the second axis and second Z components oriented with the third axis;

sintering the green ceramic test item to form a sintered ceramic test item;

measuring the sintered ceramic test item to obtain third reference data defining the sintered ceramic test item relative to the three dimensional coordinate system, the third reference data including third X components oriented with the first axis, third Y components oriented with the second axis and third Z components oriented with the third axis;

calculating shrink rates by comparison of the second reference data and the third reference data, the shrink rates including a X component shrink rate, a Y component shrink rate and a Z component shrink rate; and applying the respective shrink rates to the first reference data, the X component shrink rate being applied to the first X components, the Y component shrink rate being applied to the first Y components and the Z component shrink rate being applied to the first Z components.

42. The method of claim 41, wherein the three dimensional coordinate system is coextensive with a coordinate system of a stereolithography apparatus utilized in said building.

43. The method of claim 41; wherein said building includes building a plurality of layers from the photocurable ceramic filled resin, and wherein said photocurable ceramic filled resin includes a monomer and a photoinitator.

44. The method of claim 43, wherein said building includes exposing the photocurable ceramic filled resin to an energy dose;

which further includes leveling each of the plurality of layers of the photocurable ceramic filled resin prior to being exposed to the energy dose.

45. The method of claim 43, wherein said leveling includes wiping a surface of the photocurable ceramic filled resin with a blade.

46. A method comprising:

defining an article in terms of first reference data relative to the axes of a three dimensional coordinate system, the first reference data including first X components, first Y components and first Z components;

building in a stereolithography apparatus a green ceramic test item corresponding to the first reference data by stereolithography from a photocurable ceramic loaded resin;

sintering the green ceramic test item to define a sintered ceramic item;

measuring the sintered ceramic test item to obtain second reference data defining the sintered test item relative to the three dimensional coordinate system, the second reference data including second X components, second Y components and second Z components;

calculating shrink rates by comparison of the first reference data and the second reference data, the shrink rates including a X component shrink rate, a Y component shrink rate and a Z component shrink rate; and applying the respective shrink rates to the first reference data, the X component shrink rate being applied to the first X components, the Y component shrink rate being applied to the first Y components and the Z component shrink rate being applied to the first Z components.

47. The method of claim 46, wherein the coordinate system is coextensive with the coordinate system of the stereolithography apparatus.

48. The method of claim 47, wherein said building includes building a plurality of layers from the photocurable ceramic filled resin, and wherein the photocurable ceramic filled resin includes a monomer and a photoinitator.

49. The method of claim 48, wherein said building includes exposing the photocurable ceramic filled resin to an energy dose; and which further includes leveling each of the plurality of layers of the photocurable ceramic filled resin prior to being exposed to the energy dose.

50. The method of claim 49, wherein said leveling includes wiping a surface of the photocurable ceramic filled resin with a blade.

51. A method, comprising:

preparing a representation of an item to be built in a stereolithography apparatus from a photocurable ceramic filled material, the representation defining the item in terms of reference data relative to a three dimensional coordinate system having a $1^{st}, 2^{nd}, 3^{rd}$ axis;

adjusting the reference data to compensate for the anisotropic shrinkage of a green ceramic item upon sintering;

building the green ceramic item in the stereolithography apparatus utilizing the reference data after said adjusting, the green ceramic item being built from the photocurable ceramic filled material; and sintering the green ceramic item to define a sintered ceramic item that is substantially dimensionally accurate with the reference data.

52. The method of claim 51, wherein said building includes building a plurality of layers from the photocurable ceramic filled material, and wherein the photocurable ceramic filled material includes a monomer and a photoinitator; and which further includes leveling each of the plurality of layers of the photocurable ceramic filled material prior to forming the next layer, and wherein said building includes exposing each of the plurality of layers of the photocurable ceramic filled material to an energy dose.

53. The method of claim 51, wherein the sintered ceramic item is dimensionally accurate with the reference data within about 1.5%.

54. The method of claim 51, wherein the sintered ceramic item is dimensionally accurate with the reference data within about 0.5%.

55. The method of claim 51, wherein the photocurable ceramic filled material has a ceramic loading within a range of 35% to 65%.

56. A ceramic product, comprising:

a sintered ceramic body having at least a near net shape, the ceramic body formed by:

representing the ceramic body including its dimensions relative to a three dimensional coordinate system, the body adapted to be formed as a green ceramic item in a stereolithography apparatus from a photo-polymerizable material including ceramic particles;

applying unequal scaling factors to the dimensions to compensate for anisotropic shrinkage of the green ceramic body relative to the axes of the coordinate system upon the green ceramic body being sintered;

building the green ceramic body in the stereolithography apparatus after said adjusting; and heating the green ceramic body to form a sintered ceramic body substantially conforming to the dimensions.

* * * * *